United States Patent
Satou (10) Patent No.: US 12,005,582 B2
(45) Date of Patent: Jun. 11, 2024

(54) CONTROLLER AND CONTROL SYSTEM

(71) Applicant: Fanuc Corporation, Yamanashi (JP)

(72) Inventor: Takashi Satou, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 338 days.

(21) Appl. No.: 16/588,081

(22) Filed: Sep. 30, 2019

(65) Prior Publication Data

US 2020/0101603 A1    Apr. 2, 2020

(30) Foreign Application Priority Data

Oct. 2, 2018   (JP) ................................. 2018-187717
Jun. 10, 2019  (JP) ................................. 2019-108190

(51) Int. Cl.
*B25J 9/16*    (2006.01)
*B25J 11/00*   (2006.01)
(Continued)

(52) U.S. Cl.
CPC ............. *B25J 9/1633* (2013.01); *B25J 9/161* (2013.01); *B25J 11/005* (2013.01);
(Continued)

(58) Field of Classification Search
CPC ..... B25J 9/16; B25J 9/161; B25J 9/163; B25J 9/1633; B25J 9/1602; B25J 9/1687; B25J 9/1628; B25J 9/1679; B25J 11/00; B25J 11/005; B25J 11/0065; B25J 13/00; B25J 13/085; G05B 13/00; G05B 13/02; G05B 13/024; G05B 13/0205; G05B 19/00; G05B 19/04; G05B 19/05; G05B 19/408;
(Continued)

(56) References Cited

U.S. PATENT DOCUMENTS

2007/0210740 A1* 9/2007 Sato ..................... B25J 9/1633
                                                              318/646
2012/0296471 A1   11/2012 Inaba et al.
(Continued)

FOREIGN PATENT DOCUMENTS

CN       107263464 A    10/2017
CN       107962558 A    4/2018
(Continued)

OTHER PUBLICATIONS

Japanese Decision to Grant a Patent for Japanese Application No. 2019-108190, dated Jul. 13, 2021, with translation, 5 pages.
(Continued)

*Primary Examiner* — Khoi H Tran
*Assistant Examiner* — Sarah A Tran
(74) *Attorney, Agent, or Firm* — Buchanan Ingersoll & Rooney, PC (57) ABSTRACT

The controller acquires a force applied to a manipulator of a robot, to generate, based on the acquired data, force state data containing information related to the force applied to the manipulator and control command adjustment data indicating an adjustment behavior of a control command related to the manipulator as state data, thereby executing, based on the generated state data, a process of machine learning related to the adjustment behavior of the control command related to the manipulator.

10 Claims, 9 Drawing Sheets

(51) Int. Cl.
  *G05B 13/02* (2006.01)
  *G05B 19/05* (2006.01)
  *G05B 19/408* (2006.01)

(52) U.S. Cl.
  CPC ............ *G05B 13/024* (2013.01); *G05B 19/05* (2013.01); *G05B 19/4083* (2013.01)

(58) Field of Classification Search
  CPC ...... G05B 19/4083; G05B 2219/39318; G05B 2219/39218; G05B 2219/39323
  See application file for complete search history.

(56) References Cited

U.S. PATENT DOCUMENTS

| | | | |
|---|---|---|---|
| 2017/0028553 A1* | 2/2017 | Tsuda | B25J 9/1653 |
| 2017/0091667 A1 | 3/2017 | Yukawa | |
| 2017/0285584 A1 | 10/2017 | Nakagawa et al. | |
| 2018/0107174 A1 | 4/2018 | Takahashi | |
| 2018/0164756 A1 | 6/2018 | Yamaguchi | |
| 2018/0222048 A1* | 8/2018 | Hasegawa | B25J 9/1697 |
| 2018/0222057 A1 | 8/2018 | Mizobe et al. | |
| 2018/0225113 A1 | 8/2018 | Hasegawa | |
| 2018/0229364 A1 | 8/2018 | Wang et al. | |
| 2019/0232488 A1* | 8/2019 | Levine | G06N 3/08 |
| 2020/0223065 A1 | 7/2020 | Hane et al. | |

FOREIGN PATENT DOCUMENTS

| | | | |
|---|---|---|---|
| CN | 108227482 | A | 6/2018 |
| CN | 108393888 | A | 8/2018 |
| CN | 108422420 | A | 8/2018 |
| DE | 102012104194 | B4 | 10/2015 |
| DE | 102016011532 | A1 | 3/2017 |
| EP | 3357649 | A2 | 8/2018 |
| JP | 06195127 | A | 7/1994 |
| JP | H07-319558 | A | 12/1995 |
| JP | 2007-237312 | A | 9/2007 |
| JP | 2014006566 | A | 1/2014 |
| JP | 2018-107315 | A | 7/2018 |
| JP | 2018-126799 | A | 8/2018 |
| JP | 2018126796 | A | 8/2018 |
| JP | 2020040132 | A | 3/2020 |
| JP | 2020110900 | A | 7/2020 |

OTHER PUBLICATIONS

Notice of Reasons for Refusal for Japanese Application No. 2019-108190, dated Jan. 26, 2021, with translation, 6 pages.
German Examination Report for German Application No. 10 2019 006 725.8, dated Nov. 16, 2022, 6 pages.
Office Action (The Notification First Office Action) issued Jan. 20, 2024, by the National Intellectual Property Administration, P. R. China in corresponding Chinese Patent Application No. 201910949712.0 and an English translation of the Office Action. (21 pages).

* cited by examiner

FEED DIRECTION

CONTROLLER AND CONTROL SYSTEM

RELATED APPLICATIONS

The present application claims priority to Japanese Patent Application Number 2018-187717 filed Oct. 2, 2018 and Japanese Patent Application Number 2019-108190 filed Jun. 10, 2019, the disclosure of which are hereby incorporated by reference herein in its entirety.

BACKGROUND OF THE INVENTION

1. Field of the Invention

The present invention relates to a controller and a control system, and more particularly to a controller and a control system capable of appropriately adjusting parameters such as a pressing force, a travel speed, and a travel direction especially when a manipulator of a robot is force-controlled.

2. Description of the Related Art

A robot with a force sensor may be used for operations such as precisely fitting parts together, adjusting the phases of gears, removing burrs and polishing. When a robot is made to perform such an operation, the robot is made to grasp a part or a tool thereby to control the force in a predetermined direction to a desired value (force control). As such a force control method, there have been known an impedance control, a damping control, a hybrid control, and the like. In any of these control methods, an appropriate control gain needs to be set. There is known a method for automatically adjusting the control gain (see, for example, Japanese Patent Application Laid-Open No. 2007-237312).

As described above, the method of setting the control gain in force control is well-known, but the other parameters such as an appropriate pressing force, travel speed, and travel direction depend on the adjustment by the operator. It is difficult for an operator unskilled in such parameter adjustment to perform an actual adjustment, thus leading to problems such as taking time, resulting in variation between operators, damaging the workpiece or tool by setting improper values during adjustment.

SUMMARY OF THE INVENTION

Therefore, to solve these problems, it is desired to provide a controller and a control system capable of appropriately adjusting parameters such as a pressing force, a travel speed, and a travel direction when a manipulator of a robot is controlled. Accordingly, an object of the present invention is to provide such a controller and a control system. In an aspect of the present invention, the aforementioned problems are solved by providing the controller of the robot with a function of using machine learning to automatically adjust parameters related to control of a manipulator of an industrial robot.

A controller according to an aspect of the present invention controls an industrial robot having a function of detecting a force and a moment applied to a manipulator and includes: a control unit controlling the industrial robot based on a control command; a data acquisition unit acquiring at least one of the force and the moment applied to the manipulator of the industrial robot as acquisition data; and a pre-processing unit generating force state data including information related to the force applied to the manipulator and control command adjustment data indicating an adjustment behavior of the control command related to the manipulator as state data based on the acquisition data. And the controller performs a process of machine learning related to the adjustment behavior of the control command related to the manipulator based on the state data.

The pre-processing unit may generate determination data indicating a determination result of an operating state of the manipulator after the adjustment behavior is further performed, based on the acquisition data, and the controller may further include a learning unit generating a learning model obtained by applying reinforcement learning to the adjustment behavior of the control command related to the manipulator with respect to the state of the force applied to the manipulator, as a process of the machine learning, using the state data and the determination data.

The controller may further includes: a learning model storage unit storing a learning model obtained by applying reinforcement learning to the adjustment behavior of the control command related to the manipulator with respect to the state of the force applied to the manipulator, and a decision-making unit estimating the adjustment behavior of the control command related to the manipulator using the learning model stored in the learning model storage unit, based on the state data, as the process of the machine learning.

The pre-processing unit may generate load determination data indicating a degree of load applied to the manipulator after the adjustment behavior is performed, as the determination data.

The pre-processing unit may generate operation time data indicating a degree of operation time of the manipulator after the adjustment behavior is performed, as the determination data.

A system according to another aspect of the present invention is a system in which a plurality of devices are connected to each other via a network, wherein the plurality of devices include a first controller which is the controller mentioned above.

The plurality of devices may include a computer having a machine learning device therein, the computer may acquire a learning model as at least one result of the reinforcement learning of the first controller, and the machine learning device provided in the computer may optimize or streamline based on the acquired learning model.

The plurality of devices may include a second controller different from the first controller, and a learning result by the first controller may be shared with the second controller.

The plurality of devices may include a second controller different from the first controller, and data observed by the second controller may be available for reinforcement learning by the first controller via the network.

The present invention can appropriately adjust parameters such as a pressing force, a travel speed, and a travel direction when a manipulator of a robot is controlled based on learning results.

DETAILED DESCRIPTION OF THE PREFERRED EMBODIMENTS

Figure 1:
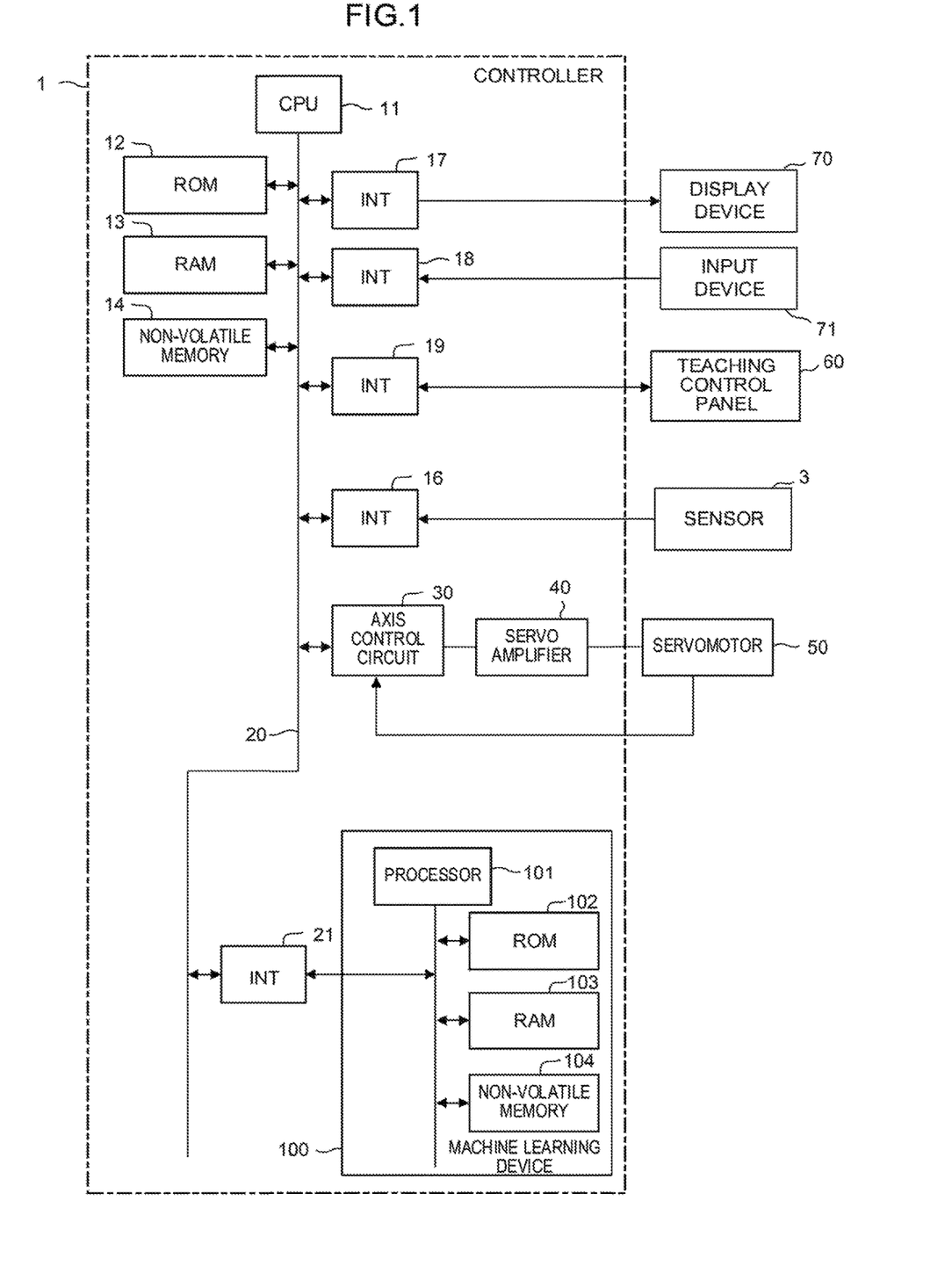
FIG. 1 is a schematic hardware configuration diagram of a controller according to an embodiment.

FIG. 1 is a schematic hardware configuration diagram illustrating main components of a controller having a machine learning device therein according to an embodiment. A controller 1 of the present embodiment can be implemented as a controller that controls an industrial robot which, for example, fits and assembles parts, removes burrs, and the like.

A CPU 11 provided in the controller 1 is a processor that controls the entire controller 1. The CPU 11 reads a system program stored in a ROM 12 via a bus 20 and controls the entire controller 1 according to the system program. A RAM 13 temporarily stores temporary calculation data as well as various data entered by an operator through a teaching control panel 60, an input device 71, and the like.

A non-volatile memory 14 is composed of, for example, a memory backed up by a battery (not shown), a solid state drive (SSD), and the like, and is configured such that even if the controller 1 is turned off, the memory state is maintained. The non-volatile memory 14 stores teaching data inputted from the teaching control panel 60 through an interface 19, data inputted from the input device 71, an industrial robot control program inputted through an interface (not shown), data (force or moment applied to the manipulator) detected by a sensor 3 attached to the industrial robot, data (the current value, position, velocity, acceleration, torque, and the like of a servomotor 50) detected by the servomotor 50 for driving an axis of the industrial robot, data read through an external storage device (not shown) or a network, and the like. The programs and various data stored in the non-volatile memory 14 may be loaded into the RAM 13 when executed or used. Note that various system programs (including a system program for controlling interactions with a machine learning device 100 to be described later) for executing processes of teaching of a robot control and a teaching position are preliminarily written in the ROM 12.

Various data read into the memory, data obtained as a result of execution of programs and the like, and data outputted from a machine learning device 100 to be described later, and other data are outputted through the interface 17 and displayed on a display device 70. Further, the input device 71 including a keyboard, a pointing device, and the like passes a command, data, and the like based on the operation by an operator to the CPU 11 through an interface 18.

The teaching control panel 60 is a manual data input device including a display, a handle, a hardware key, and the like. The teaching control panel 60 receives and displays information from the controller 1 through an interface 19, and passes pulses, commands, and various data inputted from the handle, the hardware key, and the like to the CPU 11.

An axis control circuit 30 for controlling an axis of a joint and the like provided in the industrial robot receives an axis movement command amount from the CPU 11 and outputs an axis command to a servo amplifier 40. When this command is received, the servo amplifier 40 drives the servomotor 50 to move the axis provided in the robot. The servomotor 50 of the axis incorporates a position/speed detector, and feeds back a position/speed feedback signal from this position/speed detector to the axis control circuit 30, to perform a position/speed feedback control. Note that the hardware configuration diagram of FIG. 1 illustrates only one set of the axis control circuit 30, the servo amplifier 40, and the servomotor 50, but the set of the devices is actually prepared for each axis provided in the robot to be controlled. For example, if the robot has six axes, six sets of the axis control circuit 30, the servo amplifier 40, and the servomotor 50 are prepared.

An interface 21 is an interface for connecting the controller 1 and the machine learning device 100. The machine learning device 100 comprises a processor 101 for controlling the entire machine learning device 100, a ROM 102 for storing the system program and the like, a RAM 103 for temporarily storing in each process related to machine learning, and a non-volatile memory 104 for use in storing the learning model and the like. The machine learning device 100 can observe each piece of information (the force or moment applied to the manipulator, and the current value, position, velocity, acceleration, torque, and the like of the servomotor 50) that can be acquired by the controller 1 through the interface 21. Further, the controller 1 receives a change instruction of a force command or a torque command outputted from the machine learning device 100 and performs correction or the like on the robot control command based on the program or teaching data.

Figure 2:
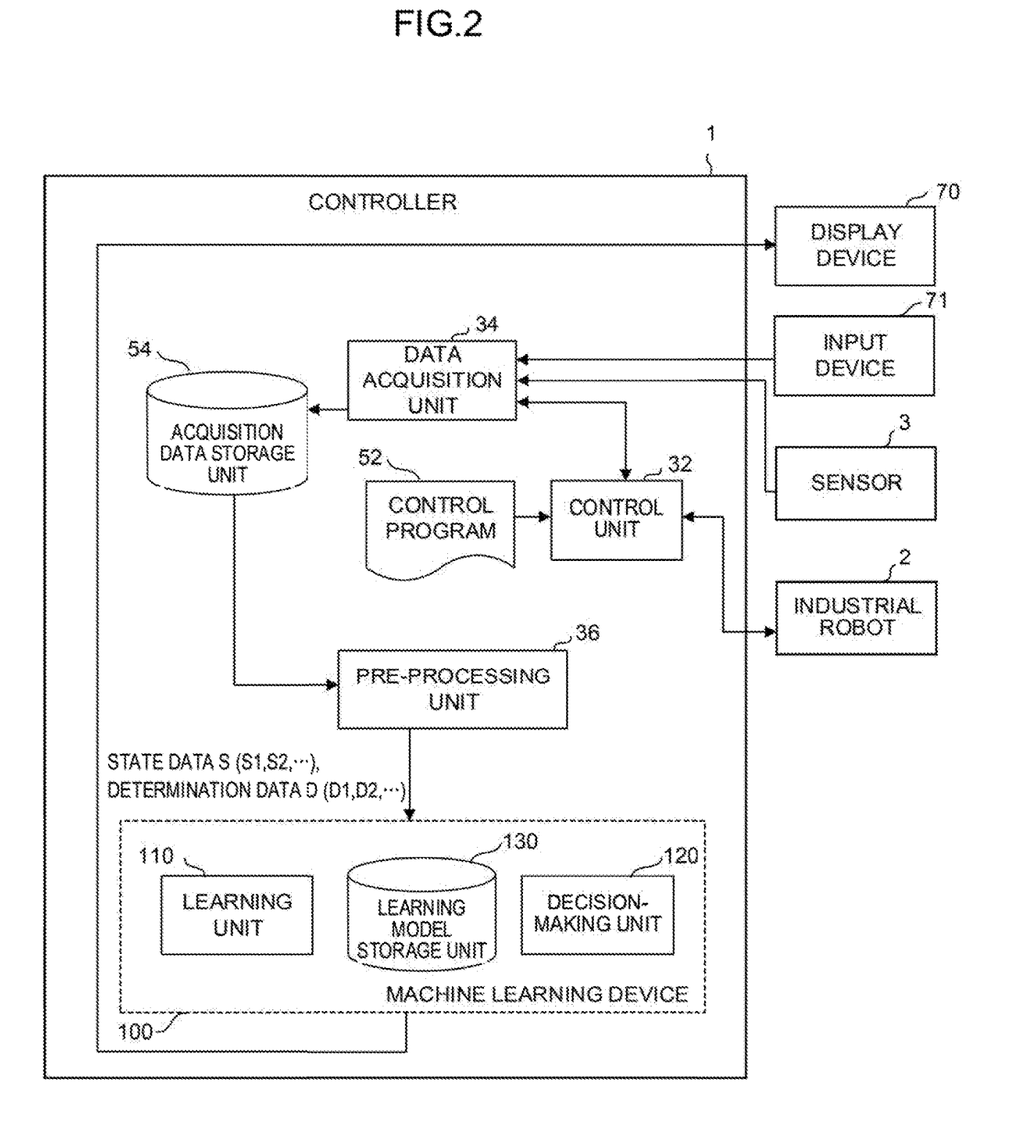
FIG. 2 is a schematic functional block diagram of a controller according to a first embodiment.

FIG. 2 is a schematic functional block diagram of the controller 1 and the machine learning device 100 according to a first embodiment.

The controller 1 of the present embodiment has a configuration required when the machine learning device 100 performs learning (learning mode). Each functional block illustrated in FIG. 2 is implemented when the CPU 11 provided in the controller 1 and the processor 101 of the machine learning device 100 illustrated in FIG. 1 execute the respective system programs and control the operation of each unit of the controller 1 and the machine learning device 100.

This controller 1 includes a control unit 32, a data acquisition unit 34, and a pre-processing unit 36. The machine learning device 100 provided in the controller 1 includes a learning unit 110 and a decision-making unit 120. Further, the non-volatile memory 14 includes therein an acquisition data storage unit 54 for storing data acquired from an industrial robot 2, the sensor 3, and the like. The non-volatile memory 104 in the machine learning device 100 includes therein a learning model storage unit 130 for storing a learning model constructed by machine learning by a learning unit 110.

The control unit 32 controls the operation of the industrial robot 2 based on a control program 52 stored in the non-volatile memory 104. The control unit 32 controls the industrial robot 2 based on a control operation on the control panel (not shown) by the operator and the control program stored in the non-volatile memory 14 and the like. Further, the control unit 32 has a general control function required to control each part of the industrial robot 2, such as outputting command data as the change amount of axis angle at each control cycle to a motor that drives an axis when the control program 52 issues a command to move each of the axes (joints) provided in the industrial robot 2. Further, the control unit 32 acquires the motor state amount (the current value, position, velocity, acceleration, torque, and the like of the motor) of each motor provided in the industrial robot 2, and outputs it to the data acquisition unit 34.

The data acquisition unit 34 acquires various data inputted from the industrial robot 2, the sensor 3, the input device 71, and the like. The data acquisition unit 34 acquires, for example, the command by the program for controlling the industrial robot, the force or moment applied to the manipulator of the industrial robot 2, the current value, position, velocity, acceleration, torque, and the like of the servomotor 50 that drives the axis of the industrial robot 2, and stores them in the acquisition data storage unit 54. The data acquisition unit 34 may acquire data detected from the sensor 3 and data related to the servomotor 50 as time series data. Further, the data acquisition unit 34 may acquire data from another computer via an external storage device (not shown) or a wired/wireless network.

The pre-processing unit 36 generates state data for use in learning by the machine learning device 100 based on data acquired by the data acquisition unit 34. More specifically, the pre-processing unit 36 generates the state data obtained by converting (digitizing, sampling, and the like) the data acquired by the data acquisition unit 34 into a uniform format to be handled by the machine learning device 100. For example, when the machine learning device 100 performs reinforcement learning, the pre-processing unit 36 generates a set of state data S and determination data D of a predetermined format in the learning.

The state data S generated by the pre-processing unit 36 includes a force state data S1 containing information on a force applied to the manipulator of the industrial robot 2 and a control command adjustment data S2 indicating the adjustment behavior of the control command (speed command, force command, torque command, and the like) of the manipulator performed in a state of force of the force state data S1.

The force state data S1 may include at least a force in a feed direction applied to the manipulator of the industrial robot 2, and may include a force applied in a direction other than the feed direction or a moment of the force. The force state data S1 may be detected by the sensor 3 installed in the manipulator of the industrial robot 2 or may be comprehensively obtained from the current or the like flowing through the servomotor 50 driving each axis of the industrial robot 2.

The control command adjustment data S2 may include at least a control command such as the speed command, the force command, and the torque command in the feed direction of the manipulator as the adjustment behavior of the control command (such as a speed command, a force command, and a torque command) in the feed direction of the manipulator performed in the state of force of the force state data S1, and may further include a control command in a direction other than the feed direction.

The determination data D generated by the pre-processing unit 36 is data indicating a determination result in an operating state of the manipulator after the adjustment behavior when the adjustment behavior of the control command indicated by the control command adjustment data S2 is performed in the state of force of the force state data S1.

The determination data D may include at least the load determination data D1 indicating a degree of load applied to the manipulator, and may include the operation time determination data D2 indicating a degree of the operation time of the manipulator.

The learning unit 110 performs machine learning using the data generated by the pre-processing unit 36. The learning unit 110 uses a well-known reinforcement learning method to generate a learning model obtained by learning the adjustment behavior of the control command (such as a speed command, a force command, and a torque command) of the manipulator with respect to the operating state of the industrial robot 2 and stores the generated learning model in the learning model storage unit 130. The reinforcement learning is a method of heuristically repeating a cycle observing the current state (that is, an input) of an environment in which a learning object exists, taking a predetermined action (that is, an output) in the current state, and giving some reward to the action, thereby to find a policy (adjustment behavior of the control command such as the speed command, the force command, and the torque command of the manipulator in the machine learning device of the present invention) so as to maximize the total of rewards, and thereby learning the policy as an optimal solution. Examples of the reinforcement learning method performed by the learning unit 110 include a Q-learning.

In the Q-learning by the learning unit 110, the reward R may be determined such that, for example, if the magnitude of the load applied when the manipulator is moved in the feed direction falls within a predetermined load range, the reward R is determined to be "good", that is, a positive (plus) reward R, and if the magnitude of the load exceeds the predetermined load, the reward R is determined to be "bad", that is, a negative (minus) reward R. Alternatively, the reward R may be determined such that, for example, if the time (such as the time taken for one operation and the time taken to move a predetermined distance) taken to move the manipulator in the feed direction falls within a predetermined threshold, the reward R is determined to be "good", that is, a positive (plus) reward R, and if the time exceeds the predetermined threshold, the reward R is determined to be "bad", that is, a negative (minus) reward R. The value of the reward R may be changed depending on the degree of the load and the length of the time taken for the operation. Note that if a plurality of data items are included as the determination condition in the determination data D, a combination of the plurality of data items may be used for the determination.

The learning unit 110 may be configured such that a neural network is used as a value function Q (learning model), assuming that the state data S and an action a are inputted to the neural network and a value (result y) of the action a in the state is outputted. When configured in this way, a neural network with three layers: an input layer, an intermediate layer, and an output layer may be used as the learning model, but a so-called deep learning method using a neural network with three or more layers may be used to perform more effective learning and inference.

The learning model generated by the learning unit 110 is stored in the learning model storage unit 130 provided in the non-volatile memory 104 and is used for an estimation process of the adjustment behavior of the control command of the manipulator of the industrial robot 2 by the decision-making unit 120.

Note that the learning unit 110 is an essential component at the learning stage, but is not necessarily an essential component after the learning of the adjustment behavior of the control command of the manipulator of the industrial robot 2 by the learning unit 110 is completed. For example, when the machine learning device 100 in which learning has been completed is shipped to a customer, the learning unit 110 may be removed before shipping.

Based on the state data S inputted from the pre-processing unit 36, and using the learning model stored in the learning model storage unit 130, the decision-making unit 120 calculates an optimal solution of the adjustment behavior of the control command related to the feed direction of the manipulator of the industrial robot 2 and outputs the calculated adjustment behavior of the control command related to the feed direction of the manipulator of the industrial robot 2. The decision-making unit 120 of the present embodiment can calculate the reward for a case in which the action is taken in the current state by inputting the state data S (such as the force state data S1 and the control command adjustment data S2) inputted from the pre-processing unit 36 and the adjustment behavior (such as the adjustment of command values for speed, force, and torque) of the control command of the manipulator of the industrial robot 2 to the learning model (parameters are determined) generated by reinforcement learning by the learning unit 110 as the input data. In this case, the reward calculation is performed on a plurality of currently available adjustment behaviors of the control command of the manipulator of the industrial robot 2. Then, by comparing the plurality of calculated rewards, the adjustment behavior of the control command of the manipulator of the industrial robot 2 having the largest reward is estimated as the optimal solution. The optimal solution of the adjustment behavior of the control command of the manipulator of the industrial robot 2 estimated by the decision-making unit 120 not only may be inputted to the control unit 32 for use in adjusting the control command of the manipulator of the industrial robot 2, but also, for example, may be outputted to the display device 70 for display and may be outputted to a host computer, a cloud computer, and other computers via a wired/wireless network for transmission.

The controller 1 having the aforementioned configuration can automatically adjust the control of feeding the manipulator by an appropriate speed adjustment and force adjustment while detecting the force and the moment applied in the feed direction of the manipulator in various operations performed using the industrial robot 2.

Figure 3:
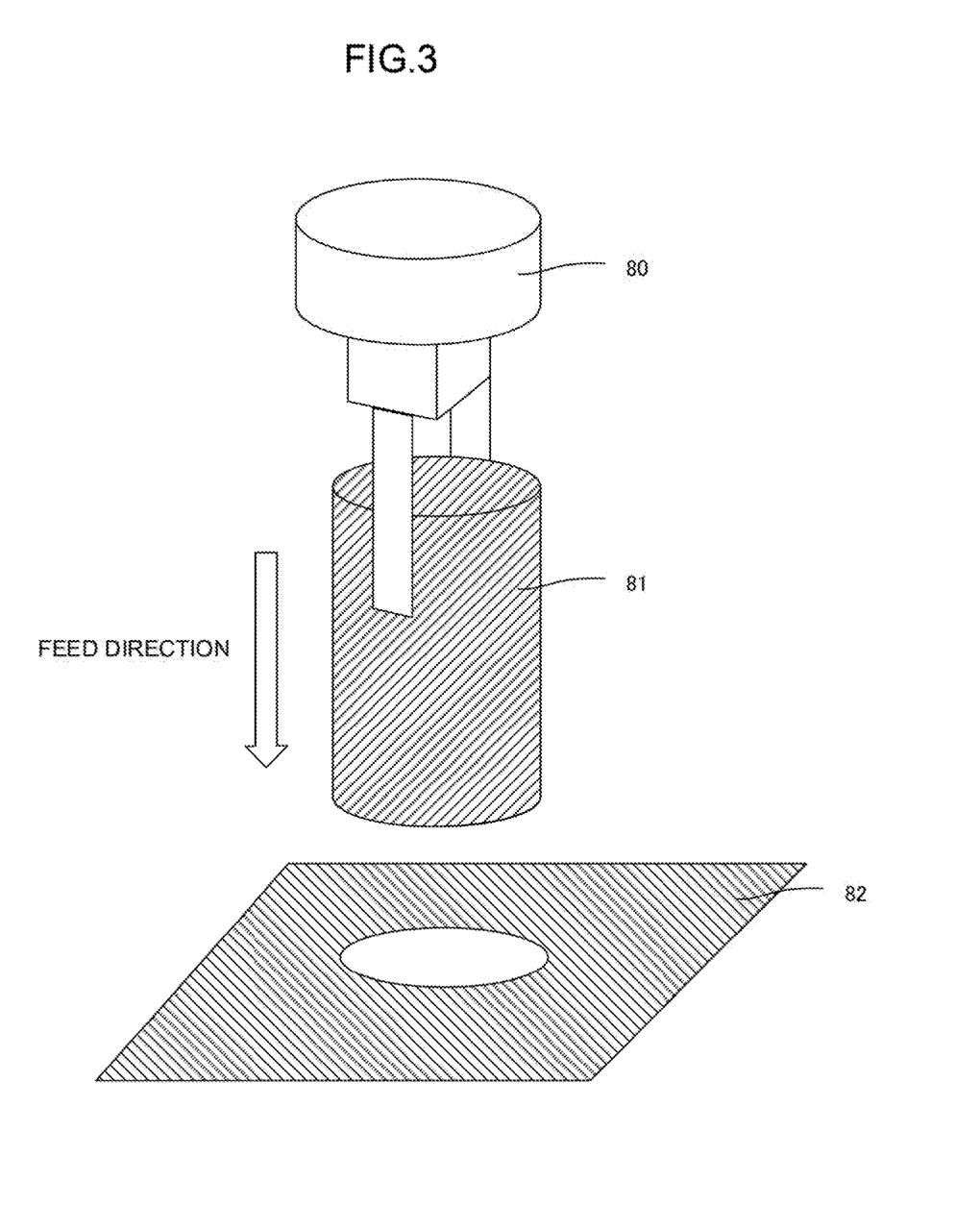
FIG. 3 is a view illustrating an example of a part-fitting operation by an industrial robot.
Figure 4:
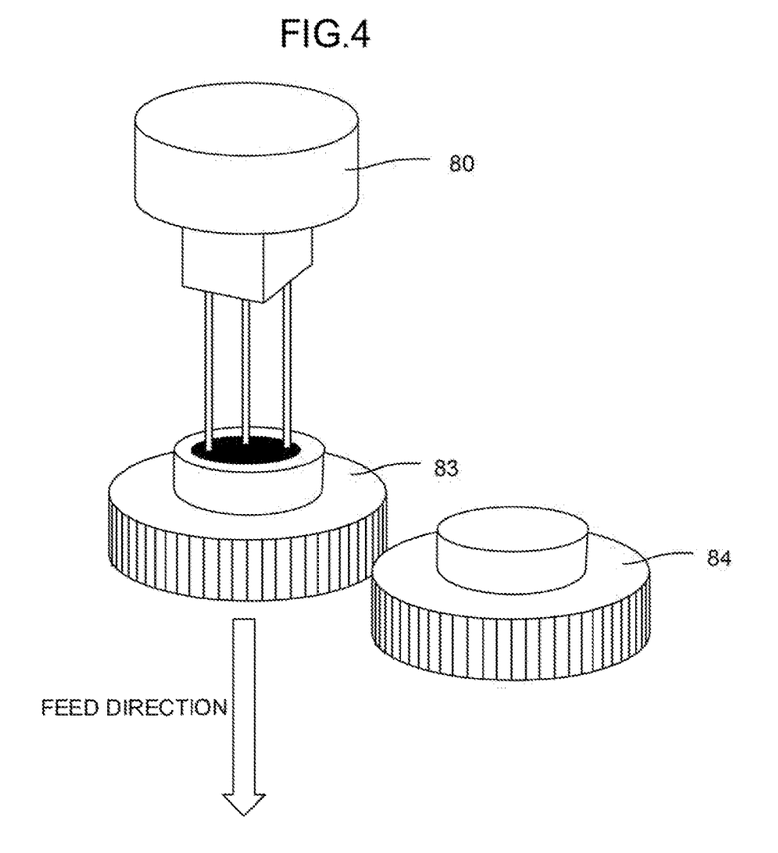
FIG. 4 is a view illustrating an example of a gear assembly operation by the industrial robot.
Figure 5:
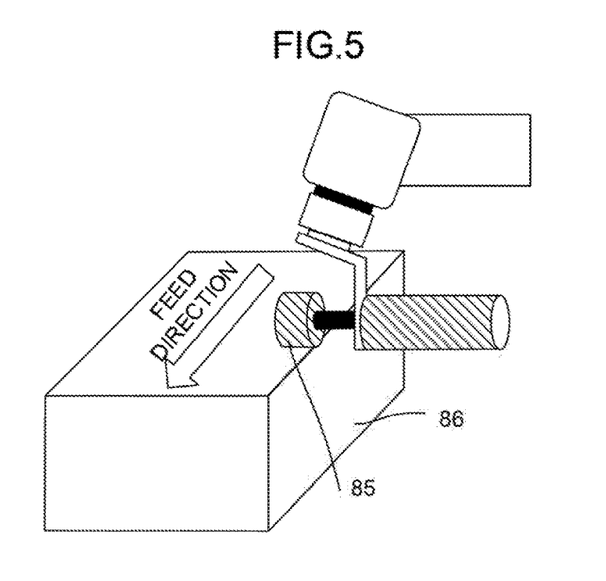
FIG. 5 is a view illustrating an example of workpiece burr removing and workpiece polishing operation by the industrial robot.

FIGS. 3 to 5 illustrate an example of operation performed by controlling the industrial robot 2 using the controller 1 of the present invention.

FIG. 3 illustrates an example of operation in which the controller 1 controls the industrial robot 2 to cause the hand 80 attached to the industrial robot 2 to grasp a part 81 and to fit the part 81 in a predetermined position of another part 82.

In such an example, the data acquisition unit 34 acquires a force in each axial direction (X-axis direction, Y-axis direction, and Z-axis direction) applied to the hand 80 of the industrial robot 2 and a moment about each axis, and then, based on the force and the moment, the pre-processing unit 36 generates the force state data S1. In contrast to this, as the adjustment behavior of the control command applied in the feed direction (fitting direction of the part 81) of the hand 80, at least one of the force command and the speed command in the feed direction is adjusted. As a result, the load determination data D1 is assumed to indicate whether or not the resultant force of the load in each axial direction applied to the hand 80 is equal to or less than a predetermined threshold, and the operation time determination data D2 is assumed to indicate whether or not the time taken to move in the fitting direction (time taken to move a predetermined distance) is equal to or less than a predetermined threshold.

Note that the adjustment behavior of the control command of the hand 80 may further include an adjustment behavior (such as a fine adjustment of inclination of the part and a fine adjustment of the position in the vertical direction relative to the fitting direction of the part) of the hand 80 in a direction other than the feed direction. While performing such an adjustment behavior, the learning unit 110 learns an appropriate adjustment behavior with respect to the force in each axial direction applied to the hand 80 in the fitting operation and the moment about each axis. According to the adjustment behavior determined by the decision-making unit 120 based on the learning result, the control unit 32 can perform an appropriate control on the industrial robot 2.

FIG. 4 illustrates an example of operation in which the controller 1 controls the industrial robot 2 to cause the hand 80 attached to the industrial robot 2 to grasp a gear 83, and while adjusting the phase of the gear 83 to another gear 84, the gears 83 and 84 are assembled.

In such an example, the data acquisition unit 34 acquires a force in the feed direction applied to the hand 80 of the industrial robot 2 and a moment about the axis of the gear 83, and then, based on the force and the moment, the pre-processing unit 36 generates the force state data S1. In contrast to this, as the adjustment behavior of the control command applied in the feed direction of the hand 80, the force command in the feed direction is adjusted. As a result, the load determination data D1 is assumed to indicate whether or not the load in the feed direction applied to the hand 80 is equal to or less than a predetermined threshold and whether or not the load about the axis of the gear 83 is equal to or less than a predetermined threshold, and the operation time determination data D2 is assumed to indicate whether or not the time taken to move in the feed direction of the hand 80 (time taken to move a predetermined distance) is equal to or less than a predetermined threshold. Note that the adjustment behavior of the control command of the hand 80 may further include an adjustment behavior of an angular velocity command about the axis of the gear 83 and the speed command. While performing such an adjustment behavior, the learning unit 110 learns an appropriate adjustment behavior with respect to the force in the feed direction applied to the hand 80 in the gear assembly operation and the moment about the axis of the gear 83. According to the adjustment behavior determined by the decision-making unit 120 based on the learning result, the control unit 32 can perform an appropriate control on the industrial robot 2.

FIG. 5 illustrates an example of operation in which the controller 1 controls the industrial robot 2 to cause a polishing tool 85 attached to the industrial robot 2 to remove burrs from or polish a workpiece 86.

In such an example, the data acquisition unit 34 acquires a force in the feed direction applied to the polishing tool 85 attached to the industrial robot 2 and a force in a pressing direction of the polishing tool 85 against the workpiece 86, and then, based on these forces, the pre-processing unit 36 generates the force state data S1. In contrast to this, as the adjustment behavior of the control command applied in the feed direction of the polishing tool 85, the speed command in the feed direction is adjusted. As a result, the load determination data D1 is assumed to indicate whether or not the load in the feed direction applied to the polishing tool 85 is equal to or less than a predetermined threshold, and whether or not the load in the pressing direction against the workpiece 86 falls within a predetermined range (equal to or greater than a first threshold and equal to or less than a second threshold), and the operation time determination data D2 is assumed to indicate whether or not the time taken to move in the feed direction of the polishing tool 85 (time taken to move a predetermined distance) is equal to or less than a predetermined threshold. Note that the adjustment behavior of the control command of the polishing tool 85 may further include an adjustment behavior of the force command in the pressing direction against the workpiece 86.

While performing such an adjustment behavior, the learning unit 110 learns an appropriate adjustment behavior with respect to the force in the feed direction applied to the polishing tool 85 and the force in the pressing direction against the workpiece 86 in the burr-removing and polishing operations. According to the adjustment behavior determined by the decision-making unit 120 based on the learning result, the control unit 32 can perform an appropriate control on the industrial robot 2.

The following description will focus on second to fourth embodiments in which the aforementioned controller 1 according to the first embodiment is implemented as a part of a system in which a plurality of devices including a cloud server, a host computer, fog computers, and edge computers (such as a robot controller and the controller) are connected to each other via a wired/wireless network.

Figure 6:
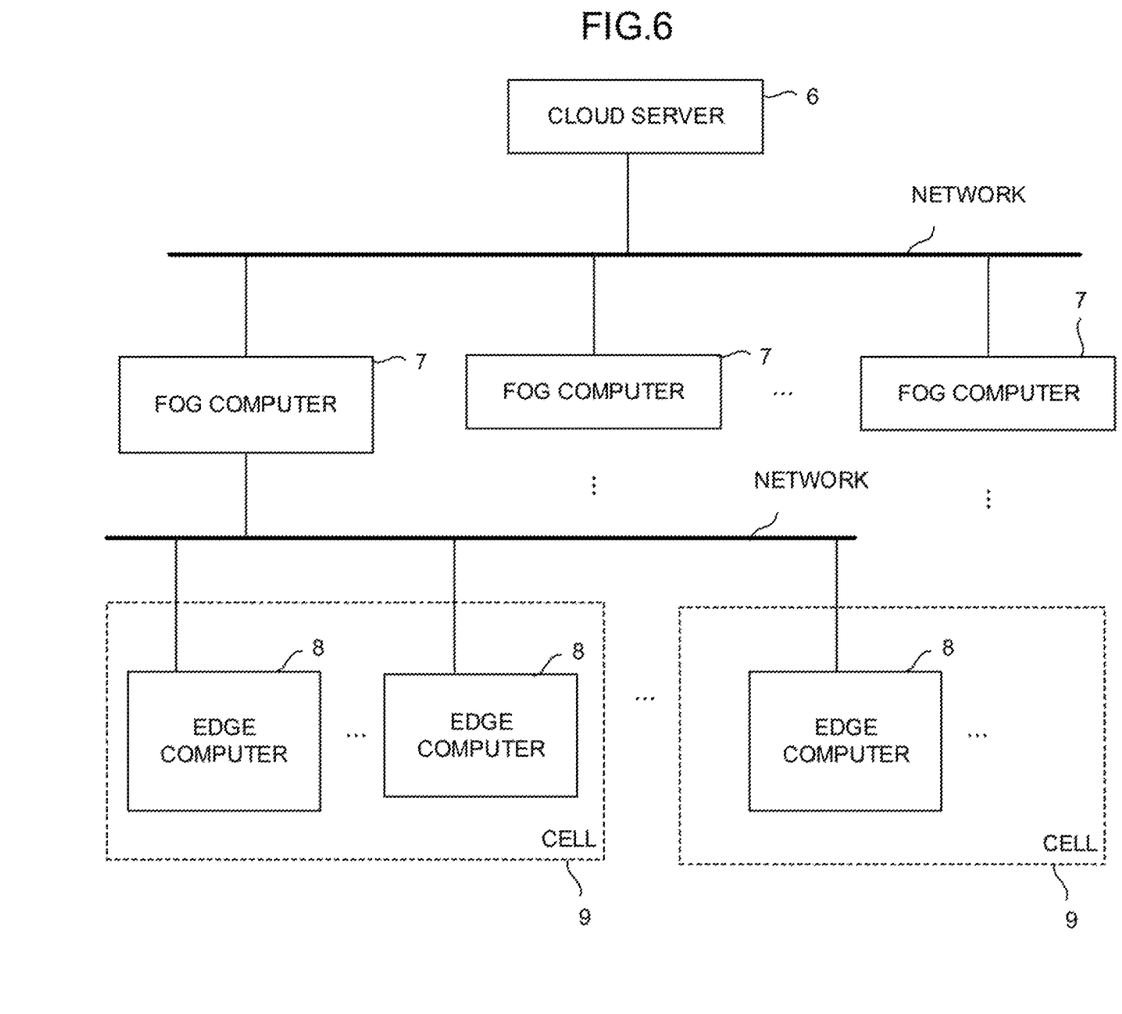
FIG. 6 is a view illustrating an example of a three hierarchical structure system including a cloud server, a fog computer, and an edge computer.

As illustrated in FIG. 6, the following second to fourth embodiments assume a system in which a plurality of devices are logically divided into three layers: a layer containing a cloud server 6 and the like, a layer containing a fog computer 7 and the like, and a layer containing an edge computer 8 (such as a robot controller and the controller included in a cell 9) in a state where each of the plurality of devices is connected to a network.

In such a system, the controller 1 according to an embodiment of the present invention can be implemented on any of the cloud server 6, the fog computer 7, and the edge computer 8, so that data for use in machine learning can be shared among the plurality of devices via the network for distributed learning, the generated learning model can be collected in the fog computer 7 and the cloud server 6 for large-scale analysis, and further the generated learning model can be mutually reused.

In the system illustrated in FIG. 6, a plurality of cells 9 are provided in a factory in various places and a fog computer 7 located in the upper layer manages each cell 9 in a predetermined unit (such as in units of factories and in units of a plurality of factories of the same manufacturer). The data collected and analyzed by these fog computers 7 are further collected and analyzed by the cloud server 6 in the upper layer, and the information obtained as the result can be used for control and the like by each edge computer 8.

Figure 7:
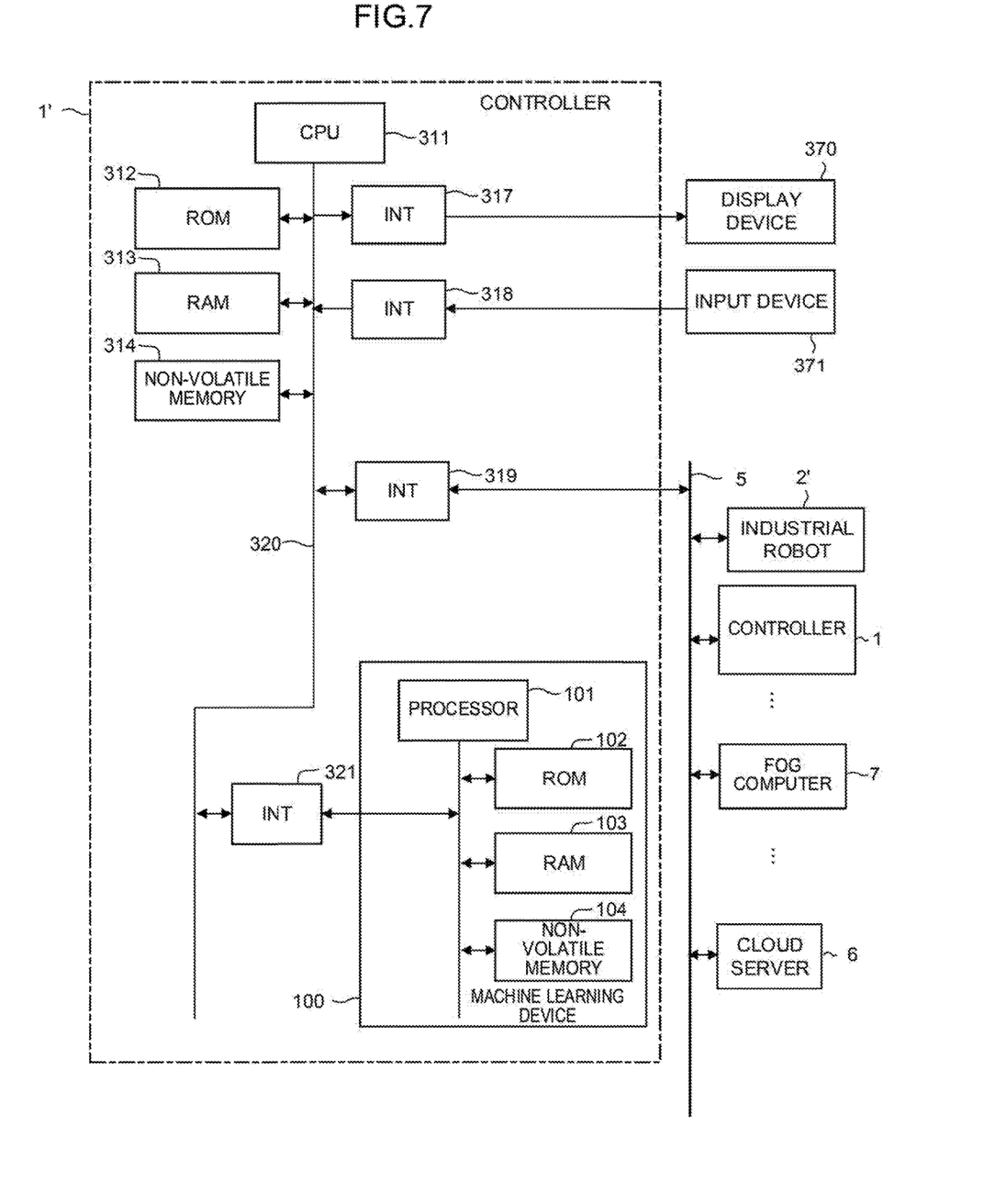
FIG. 7 is a schematic hardware configuration diagram of the controller in an embodiment being implemented on a computer.

FIG. 7 is a schematic hardware configuration diagram in which the controller is implemented on a computer such as the cloud server and the fog computer.

A CPU 311 provided in the controller 1' implemented on the computer according to the present embodiment is a processor that controls the entire controller 1'. The CPU 311 reads a system program stored in a ROM 312 via a bus 320 and controls the entire controller 1' according to the system program. A RAM 313 temporarily stores temporary calculation data, display data, and other various data entered by the operator through an input unit (not shown).

A non-volatile memory 314 is configured as a memory, which is, for example, backed up by a battery (not shown) so that even if the controller 1' is turned off, the memory state is maintained. The non-volatile memory 314 stores programs inputted through an input device 371 and various data acquired from each unit of the controller 1' and from the industrial robot 2' through a network 5. The programs and various data stored in the non-volatile memory 314 may be loaded into the RAM 313 when executed or used. Note that various system programs such as a well-known analysis program (including a system program for controlling interactions with a machine learning device 100 to be described later) are preliminarily written in the ROM 312.

The controller 1' is connected to a wired/wireless network 5 through an interface 319. At least one industrial robot 2' (an industrial robot having the controller), another controller 1, an edge computer 8, a fog computer 7, a cloud server 6, and the like are connected to the network 5 and mutually exchange data with the controller 1'.

Various data read into the memory, data obtained as a result of execution of programs, and the like are outputted through the interface 317 and displayed on a display device 370. Further, the input device 371 including a keyboard, a pointing device, and the like passes a command, data, and the like based on the operation by an operator to the CPU 311 through an interface 318.

An interface 321 is an interface for connecting the controller 1' and the machine learning device 100. The machine learning device 100 has the same configuration as that described in FIG. 1.

Thus, when the controller 1' is implemented on a computer such as a cloud server and a fog computer, the functions provided in the controller 1' are the same as those described in the first embodiment except that the acquisition of information from the industrial robot 2' and the adjustment of the control command of the manipulator with respect to the industrial robot 2' are exchanged through the network 5. At this time, since the industrial robot 2' has the controller, the control unit (see FIG. 2) provided in the controller 1' does not control the industrial robot 2', but acquires and controls the information related to the processing state of the industrial robot 2' through the controller provided in the industrial robot 2'.

Figure 8:
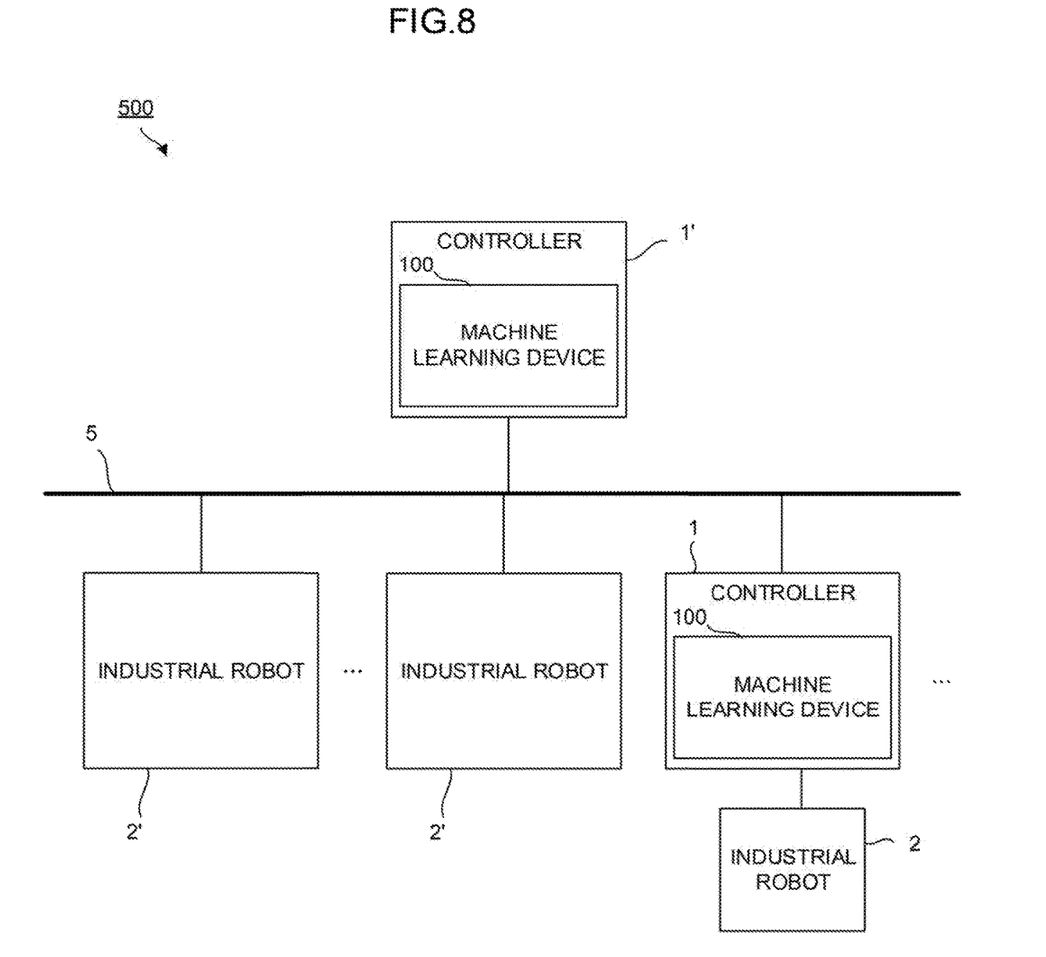
FIG. 8 is a schematic configuration diagram of a control system according to a second embodiment.

FIG. 8 is a schematic configuration diagram of a control system according to a second embodiment having a controller 1'.

A control system 500 of the present embodiment comprises a plurality of controllers 1 and 1', a plurality of industrial robots 2', and the network 5 connecting these controllers 1 and 1' and the industrial robots 2' to each other.

In this control system 500, the controller 1' having the machine learning device 100 estimates the adjustment of the control command of the manipulator in the industrial robot 2' using the learning result of the learning unit 110. Further, the control system 500 can be configured such that at least one controller 1' learns the adjustment of the control command of the manipulator in each of the industrial robots 2 and 2' common to all the controllers 1 and 1' based on the state variable S and the determination data D obtained by each of the other plurality of controllers 1 and 1' and all the controllers 1 and 1' share the learning results. Therefore, the control system 500 can improve learning speed and reliability by using more diverse data sets (including the state variable S and the determination data D) as the input.

Figure 9:
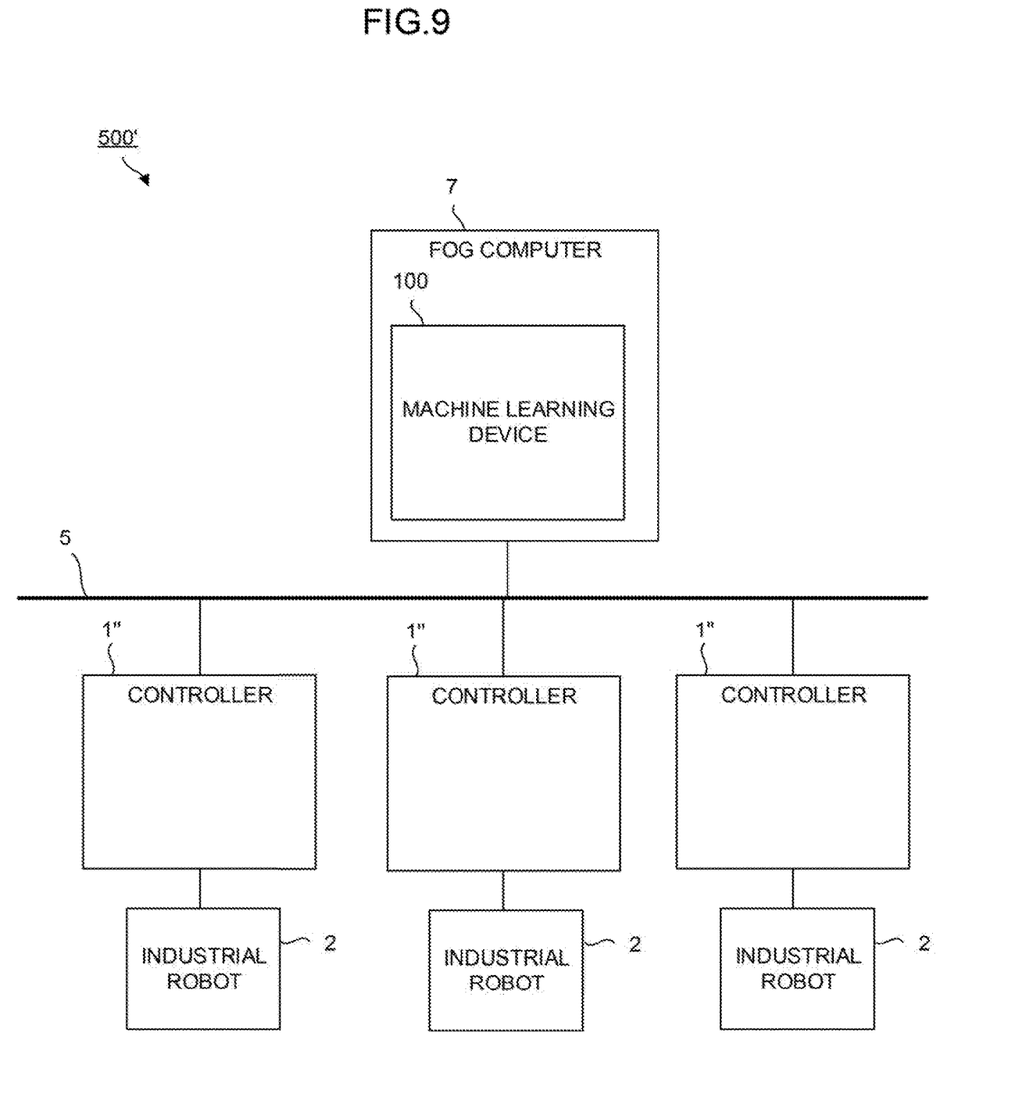
FIG. 9 is a schematic configuration diagram of a control system according to a third embodiment.

FIG. 9 is a schematic configuration diagram of a system according to a third embodiment in which the machine learning device and the controller are implemented on a different device.

A control system 500' of the present embodiment comprises at least one machine learning device 100 (illustrated as an example implemented as a part of the fog computer 7 in FIG. 9) implemented as a part of a computer such as a cloud server, a host computer, and a fog computer, a plurality of controllers 1", and the network 5 connecting these controllers 1" and the computer to each other. Note that the hardware configuration of the computer is the same as the schematic hardware configuration of the controller 1' illustrated in FIG. 7 such that the hardware components such as the CPU 311, the RAM 313, and the non-volatile memory 314 provided in a general computer are connected through the bus 320.

In the control system 500' having the aforementioned configuration, based on the state variable S and the determination data D obtained from each of the plurality of controllers 1", the machine learning device 100 learns the adjustment of the control command of the manipulator in the industrial robot 2 common to all the controllers 1", and then by using the learning result, can perform the adjustment of the control command of the manipulator in each industrial robots 2. According to the configuration of the control system 500', when needed, the necessary number of controllers 1" can be connected to the machine learning device 100 regardless of where and when each of the plurality of controllers 1" exists.

Figure 10:
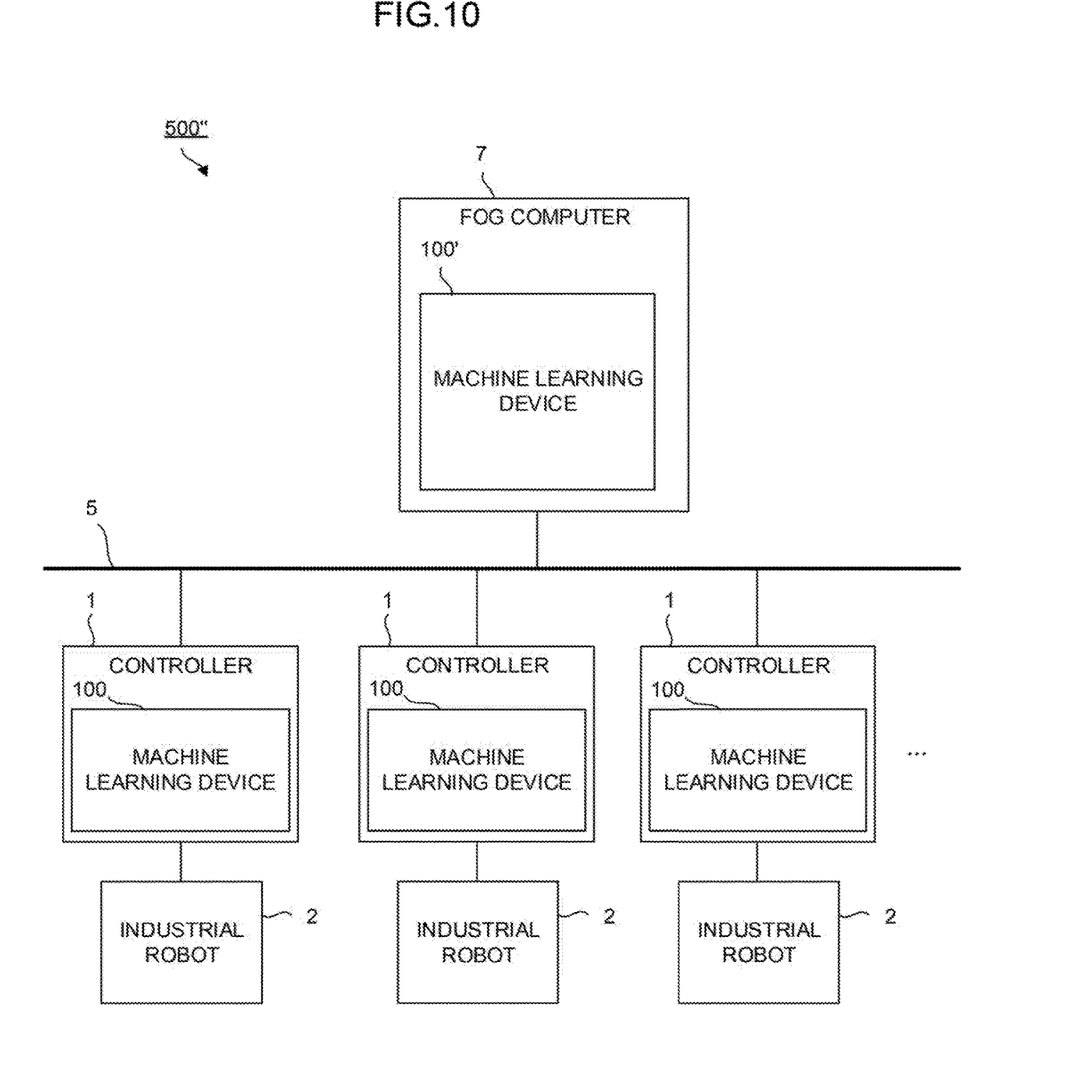
FIG. 10 is a schematic configuration diagram of a control system according to a fourth embodiment.

FIG. 10 is a schematic configuration diagram of a control system 500" having a machine learning device 100' and the controller 1 according to a fourth embodiment.

A control system 500" of the present embodiment comprises at least one machine learning device 100' (illustrated as an example implemented as a part of the fog computer 7 in FIG. 10) implemented on a computer such as an edge computer, a fog computer, a host computer, and a cloud server, a plurality of controllers 1, and the wired/wireless network 5 connecting these controllers 1 and the computer to each other.

In the control system 500" having the aforementioned configuration, the fog computer 7 having the machine learning device 100' acquires the learning model obtained as the result of the machine learning by the machine learning device 100 provided in the controller 1, from each controller 1. Then, the machine learning device 100' provided in the fog computer 7 optimizes or streamlines the knowledge based on these plurality of learning models, thereby to generate a newly optimized or streamlined learning model and then to distribute the generated learning model to each controller 1.

Examples of optimizing or streamlining the learning model by the machine learning device 100' include generation of a distillation model based on a plurality of learning models obtained from each controller 1. In this case, the machine learning device 100' of the present embodiment generates input data to be inputted to the learning model. Then, by using an output obtained as the result by inputting the input data to each learning model, the machine learning device 100' generates a new learning model (distillation model) by learning from scratch. The thus generated distillation model is distributed to and used by the controller 1 and other computers through an external storage medium or the network 5 as described above.

Another example of optimizing or streamlining the learning model by the machine learning device 100' may be considered such that in the process of performing distillation on a plurality of learning models acquired from each controller 1, a distribution of output data of each learning model with respect to input data is analyzed by a general statistical method (such as an outlier test) to extract an outlier of a set of input data and output data and to perform distillation using the set of input data and output data excluding the outliers. By going through such a process, exceptional estimation results are excluded from the set of input data and the output data obtained from each learning model, and by using the set of input data and the output data with the exceptional estimation results excluded, the distillation model can be generated. The distillation model generated in this manner can be used as a more versatile learning model than the learning model generated by a plurality of controllers 1.

Note that other general methods of optimizing or streamlining the learning model (such as a method of analyzing each learning model and optimizing hyperparameters of the learning model based on the analysis result) may be introduced as needed.

An example of operation of the control system 500" according to the present embodiment may be such that the machine learning device 100' is arranged on the fog computer 7 installed for a plurality of controllers 1 as the edge computer, the learning model generated by each controller 1 is collected by and stored in the fog computer 7, optimization or streamlining is performed based on a plurality of stored learning models, and then the optimized or streamlined learning model is redistributed to each controller 1 as needed.

Another example of operation of the control system 500" according to the present embodiment may be such that the learning models collected by and stored in the fog computer 7 and the learning models optimized or streamlined by the fog computer 7 are collected by a host computer or a cloud server that ranks higher, and these learning models are used for application to intelligent work at a factory or at the manufacturer of the controller 1 (such as construction and redistribution of a further versatile learning model in an upper server, support of maintenance work based on the analysis results of the learning models, analysis of performance and the like of each controller 1, and application to development of a new machine, and the like).

Hereinbefore, the embodiments of the present invention have been described, but the present invention is not limited only to the above described embodiments and can be implemented in various forms by adding appropriate modifications.

For example, the above embodiments have been described such that the controller 1 and the machine learning device 100 have a different CPU (processor), but the machine learning device 100 may be implemented by the CPU 11 provided in the controller 1 and the system program stored in the ROM 12.

The invention claimed is:

1. A controller configured to control an industrial robot having a function of detecting at least a force applied to a manipulator, the controller comprising:
at least one memory; and
at least one processor configured to:
obtain at least the force applied in a feed direction of the manipulator and a moment about an axis of the feed direction of the manipulator, and a control command of the industrial robot as acquisition data, wherein the feed direction is a fitting direction of a part grasped by the manipulator to a predetermined position of another part;
generate, based on the acquisition data, data including information indicating the force applied to the manipulator in only the feed direction and information indicating the control command of the industrial robot; and
generate, based on the generated data, a neural network configured to output a value to determine an adjustment action of the control command for a change in at least one of a force, speed or torque applied in only the feed direction of the manipulator,
wherein a change is made of a command value for at least one of the force, speed or torque of the control command related to the feed direction of the manipulator when the determined value exceeds a predetermined threshold during the control of the industrial robot.

2. A controller configured to control an industrial robot having a function of detecting at least a force applied to a manipulator, the controller comprising:
at least one memory; and
at least one processor configured to:
obtain at least the force applied in a feed direction of the manipulator and a moment about an axis of the feed direction of the manipulator, and a control command of the industrial robot as acquisition data, wherein the feed direction is a fitting direction of a part grasped by the manipulator to a predetermined position of another part;
generate, based on the acquisition data, data including information indicating the force applied to the manipulator in only the feed direction and information indicating the control command of the industrial robot; and
generate, based on the generated data, a learning model of a neural network obtained by applying reinforcement learning to determine a value for an adjustment behavior of the control command for a change in at least one of a force, speed or torque related to the manipulator with respect to a state of the force applied in only the feed direction of the manipulator,
wherein a change is made of a command value for at least one of the force, speed or torque of the control command related to the feed direction of the manipulator when the determined value exceeds a predetermined threshold during the control of the industrial robot.

3. A controller according to the claim 2, wherein,
the at least one processor generates load determination data indicating a degree of load applied to the manipulator after the adjustment behavior is performed, as the generated data.

4. A control system in which a plurality of devices are connected to each other via a network, wherein,
the plurality of devices include a first controller which is the controller according to claim 2.

5. The control system according to claim 4, wherein,
the plurality of devices include a computer having a machine learning device therein,
the computer acquires the learning model as at least one result of the reinforcement learning of the first controller, and
the machine learning device provided in the computer optimizes or streamlines based on the acquired learning model.

6. The control system according to claim 4, wherein,
the plurality of devices include a second controller different from the first controller, and a learning result by the first controller is shared with the second controller.

7. The control system according to claim 4, wherein,
the plurality of devices include a second controller different from the first controller, and data observed by the second controller is available for reinforcement learning by the first controller via the network.

8. A controller configured to control an industrial robot having a function of detecting at least a force applied to a manipulator, the controller comprising:
at least one memory; and
at least one processor configured to:
obtain at least the force applied in a feed direction of the manipulator and a moment about an axis of the feed direction of the manipulator, and a control command of the industrial robot as acquisition data, wherein the feed direction is a fitting direction of a part grasped by the manipulator to a predetermined position of another part;
generate, based on the acquisition data, data including information indicating the force applied to the manipulator in only the feed direction and information indicating the control command of the industrial robot; and
store in the at least one memory a learning model obtained by applying reinforcement learning to determine a value for an adjustment behavior of the control command for a change in at least one of a force, speed or torque related to the manipulator with respect to a state of the force applied in only the feed direction of the manipulator by considering a work time of the manipulator based on the control command; and
estimate, based on the generated data, the adjustment behavior of the control command related to the manipulator using the learning model stored in the at least one memory,
wherein a change is made of a command value for at least one of the force, speed or torque of the control command related to the feed direction of the manipulator when the determined value exceeds a predetermined threshold during the control of the industrial robot.

9. A controller configured to control an industrial robot having a function of detecting at least a force applied to a manipulator, the controller comprising:
at least one memory; and
at least one processor configured to:
obtain at least the force applied in a feed direction of the manipulator and a moment about an axis of the feed direction of the manipulator, and a control command of the industrial robot as acquisition data, wherein the feed direction is a fitting direction of a part grasped by the manipulator to a predetermined position of another part;
generate, based on the acquisition data, data including information indicating the force applied to the manipulator in only the feed direction and information indicating the control command of the industrial robot; and
obtain a value of an adjustment action of the control command for a change in at least one of a force, speed or torque applied in only the feed direction of the manipulator based on an output from a neural network when the generated data is input to a pre-generated neural network,
wherein a change is made of a command value for at least one of the force, speed or torque of the control command related to the feed direction of the manipulator when the obtained value of the adjustment action exceeds a predetermined threshold during the control of the industrial robot.

10. The controller according to claim 1, wherein in a fine adjustment action, a direction other than the feed direction of the manipulator is used for fine adjustment of the part grasped by the manipulator.

* * * * *